(No Model.)
A. F. DUVALL.
GIG-SADDLE TREE.
No. 367,277. Patented July 26, 1887.
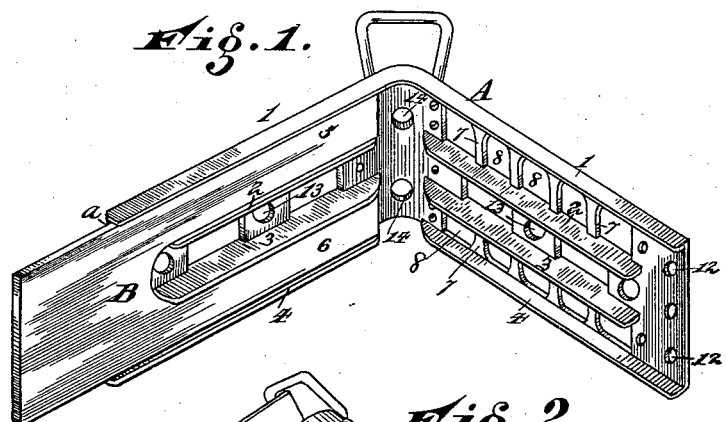
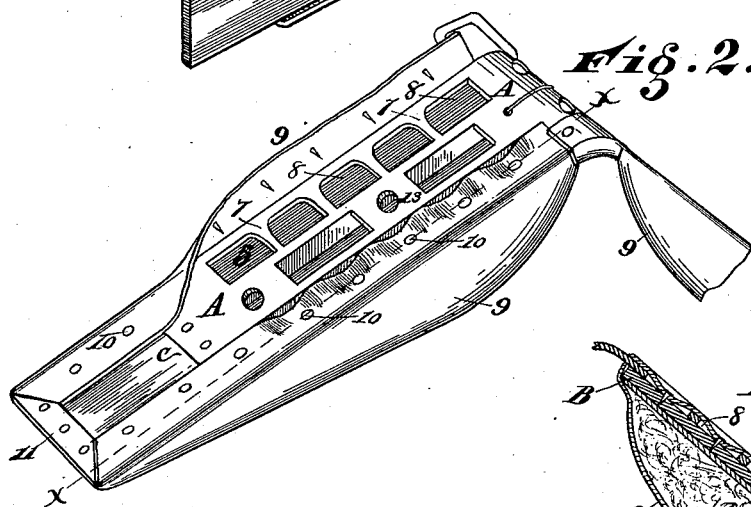
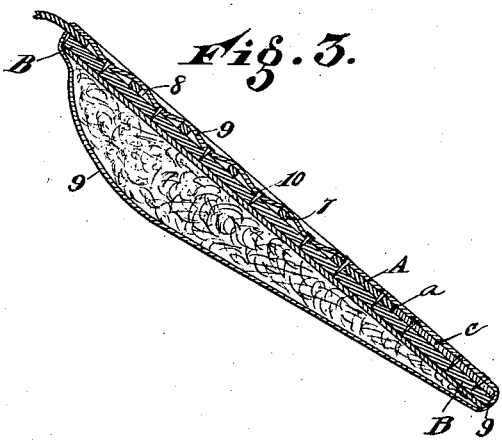
Attest
J. Watson Sims
M. E. Millikan
Inventor
Anthony F. Duvall
by Wood & Boyd
his Attorneys

UNITED STATES PATENT OFFICE.

ANTHONY F. DUVALL, OF CINCINNATI, OHIO, ASSIGNOR TO PERKINS, CAMPBELL & CO., OF SAME PLACE.

GIG-SADDLE TREE.

SPECIFICATION forming part of Letters Patent No. 367,277, dated July 26, 1887.

Application filed May 24, 1887. Serial No. 239,222. (No model.)

*To all whom it may concern:*

Be it known that I, ANTHONY F. DUVALL, a resident of Cincinnati, in the county of Hamilton and State of Ohio, have invented certain new and useful Improvements in Strap Gig-Trees, of which the following is a specification.

My invention relates to the construction of trees for buggy-harness and the method of connecting the pad thereto.

One of the objects of my invention is to dispense with rivets in connecting the base-leather to the metallic tree.

Another object of my invention is to construct the tree with apertures which, in addition to allowing the tack to go through the pad-cover into the base-piece, are sufficiently large to take up the surplus covering and prevent it from puckering.

Another object of my invention is to simplify and cheapen the cost of constructing the pad, and at the same time secure a better support for the pad and better means for attaching the same to the tree, all of which will be fully set forth in the description of the accompanying drawings, making a part of this specification, in which—

Figure 1 is a perspective view of the under side of the tree with one of the base-leathers in position. Fig. 2 is a perspective view of the top of one side of the tree, showing the means of attaching the pad thereto. Fig. 3 is a vertical section on line $x$ $x$, Fig. 2. Fig. 4 is a plan view of one of the base-pieces.

A represents a metallic tree having upon each wing of its under side vertical flanges 1 2 3 4, which form three channels, the outer two of which are employed to receive the strips 5 6 of the base-piece B, and the inner channel receives the ordinary burrs or nuts which secure the terrets to the tree.

7 represents a series of ribs connecting the two outer flanges 1 2 and 3 4 together.

8 represents openings formed between the ribs. These openings are made of considerable dimensions, in order to allow the covering of the pad to fill in and to take up the surplus material and prevent puckering, which would otherwise occur upon the doubling around of the cover. These spaces also allow the use of a much less number of tacks for attaching the covering to the tree.

The pad is attached to the tree in the following manner: The base-pieces B are slotted out, as shown in Fig. 4, with the tongues 5 6 resting in the outer channels in the under side of the tree. The end of the base-piece B projects sufficiently beyond the channels to allow the end of the pad-covering to be doubled over and be tacked thereto.

9 represents the pad-cover, the edges of which are doubled over the top side of the tree and secured to the base-piece by the tacks 10, which pass through the covering and through the spaces 8 into the base-piece B. In Fig. 2 I have shown one side partially turned up to illustrate the mode of turning over the covering and tacking it through the spaces 8 into the base-piece B. The sides of the cover are doubled over and tacked to the base-piece around the tree, the end lap, 11, being left open to receive the stuffing forming the pad. When the pad has been stuffed, this lap 11 is turned over and tacked into the base-piece B, thereby firmly securing the covering 9 around the tree to the base-piece by the tacks passing through the covering through the apertures in the base-plate between the inner flanges, 2 3, through which the stems of the terrets pass, to be secured thereto by the ordinary burr or tap.

I have not shown the strap and skirts attached to the pad in order to secure it around the body of the animal, as they may be constructed and attached in any well-known manner, and are not a part of my invention.

I have shown the base-piece B made of one piece of leather; but I do not confine myself to making the same of one piece.

In Fig. 3 I have shown the notch $a$, which represents the thickness of the tree projecting above the base-plate B, filled up with a leather strip, $c$. This is simply for the purpose of filling up the notch, and is not a feature of the invention.

It will be observed that the vertical flange 1 extends from end to end of both wings and in the center 14 of the pad. This is important, as it serves to strengthen the tree. It will be also observed that flanges 3 4 are cut away at the center to allow a sufficient space to receive the burrs and hook.

What I claim for my invention, and desire to secure by Letters Patent, is—

1. A gig-saddle tree formed of a single piece of metal and provided with the vertical flanges 1 2 3 4 upon each side or wing thereof, with the enlarged apertures 8 and the strengthening-ribs 7, substantially as and for the purpose specified.

2. The gig-tree A, composed of a single piece of metal having the vertical flanges 1 2 3 4, with the enlarged apertures 8 formed between the flanges, and the solid end provided with the apertures 12, substantially as specified.

3. A gig-tree pad composed substantially of metallic base A, having vertical flanges and channels upon its under side, the base-piece B, with the tongues 5 6, resting in the outer channels on the under side of the tree, and the covering 9, secured to the base-piece and tree, substantially as and for the purpose specified.

4. A saddle-tree composed of a single piece of metal having the vertical flanges 2 3 4 projecting down from the under side and cut away at the center, and one or more of said flanges extending through as a stiffening-piece, substantially as specified.

In testimony whereof I have hereunto set my hand.

ANTHONY F. DUVALL.

Witnesses:
FRANK C. GAYMON,
J. WATSON SIMS.